US010604895B2

(12) United States Patent
Mahler et al.

(10) Patent No.: US 10,604,895 B2
(45) Date of Patent: Mar. 31, 2020

(54) METHOD OF IMPROVING PAPER MACHINE FORMING WIRE, FELT AND WOVEN DRYER BELT PERFORMANCE BY THE APPLICATION OF PEROXIDE CONTAINING SOLUTIONS

(71) Applicant: Dubois Chemicals, Inc., Sharonville, OH (US)

(72) Inventors: Brandon E. Mahler, Cincinnati, OH (US); Harold Laser, Hamilton, OH (US)

(73) Assignee: DuBois Chemicals, Inc., Sharonville, OH (US)

( * ) Notice: Subject to any disclaimer, the term of this patent is extended or adjusted under 35 U.S.C. 154(b) by 108 days.

(21) Appl. No.: 15/831,858

(22) Filed: Dec. 5, 2017

(65) Prior Publication Data

US 2018/0155872 A1 Jun. 7, 2018

Related U.S. Application Data

(60) Provisional application No. 62/430,752, filed on Dec. 6, 2016.

(51) Int. Cl.

| | |
|---|---|
| ***D21F 1/32*** | (2006.01) |
| ***D21H 21/02*** | (2006.01) |
| ***C11D 3/39*** | (2006.01) |
| ***C01B 15/037*** | (2006.01) |
| ***D21C 9/08*** | (2006.01) |
| ***D21C 9/00*** | (2006.01) |

(52) U.S. Cl.

CPC .............. *D21F 1/32* (2013.01); *C01B 15/037* (2013.01); *C11D 3/3905* (2013.01); *C11D 3/3937* (2013.01); *D21C 9/008* (2013.01); *D21C 9/08* (2013.01); *D21H 21/02* (2013.01)

(58) Field of Classification Search

USPC .......................................................... 162/272

See application file for complete search history.

(56) References Cited

U.S. PATENT DOCUMENTS

| | | | | |
|---|---|---|---|---|
| 4,995,944 | A | 2/1991 | Aston et al. | |
| 5,368,694 | A | 11/1994 | Rohlf et al. | |
| 5,961,735 | A | 10/1999 | Heitmann, Jr. et al. | |
| 7,101,832 | B2 | 9/2006 | Asher et al. | |
| 7,306,702 | B2 | 12/2007 | Pease et al. | |
| 7,578,904 | B2 | 8/2009 | Pease et al. | |
| 2008/0138373 | A1 * | 6/2008 | Liu | A01N 25/34 424/414 |
| 2012/0204916 | A1 * | 8/2012 | Laser | C11D 3/2037 134/198 |
| 2013/0126113 | A1 | 5/2013 | Tan et al. | |
| 2015/0041406 | A1 * | 2/2015 | Xiao | C02F 1/52 210/728 |
| 2015/0148279 | A1 * | 5/2015 | Laser | C11D 3/2037 510/276 |

FOREIGN PATENT DOCUMENTS

| | | |
|---|---|---|
| WO | 199701669 | 1/1997 |

* cited by examiner

*Primary Examiner* — Mark Halpern

(74) *Attorney, Agent, or Firm* — Dinsmore & Shohl LLP

(57) ABSTRACT

Embodiments are directed to methods for inhibiting contaminants formation during papermaking operation. The method includes preparing an aqueous solution having a pH greater than 7.0 and comprising peroxide; and applying the aqueous solution onto or within one or more of forming wires, press felts and woven through air drying (TAD) belts prior to contacting and transporting a wet paper web to inhibit the formation of wet paper web contaminants onto the surfaces of or within the forming wires, press felts and woven TAD belts.

13 Claims, 3 Drawing Sheets

METHOD OF IMPROVING PAPER MACHINE FORMING WIRE, FELT AND WOVEN DRYER BELT PERFORMANCE BY THE APPLICATION OF PEROXIDE CONTAINING SOLUTIONS

CROSS REFERENCE TO RELATED APPLICATIONS

This application claims the benefit of U.S. Provisional Application Ser. No. 62/430,752, filed Dec. 6, 2016, the contents of which are hereby incorporated in their entirety.

TECHNICAL FIELD

Embodiments described herein relate generally to the application of a peroxide containing solution that prevents the accumulation and/or the removal of hydrogel contaminants from papermaking forming wires, felts and woven dryer belts.

BACKGROUND

Generally, the paper manufacturing process employs a machine that systematically de-waters pulp slurry. The pulp slurry consists largely of cellulose wood fibers, along with various chemical additives used as fillers and functional components of the paper or paper products. The pulp is prepared from various species of wood. Two pulping methods include chemical digestion to separate the cellulose fibers from lignin and other natural organic binders, or mechanical grinding and refining. The resulting cellulose fibers are used in the manufacture of paper products, whereby the pulp is supplied to a paper machine system, slurried in water to various solids levels (termed "consistency"), and ultimately diluted to about 0.5-1.0% solids for subsequent de-watering to form a sheet of paper. This low consistency of solids of the pulp facilitates fast drainage on the paper former, while also achieving proper fiber-to-fiber contact and orientation in the sheet. De-watering begins on the paper former, which is a synthetic wire or mesh that permits drainage to form a wet-web.

The wet-web is then transferred into the machine press section and is squeezed between roller nips and synthetic press felts (predominantly comprised of nylon) to further remove water. The web is further transferred through a dryer section comprised of steam-heated roller cans. Finally, the sheet is wound onto a reel. Other process stages can include on-machine surface sizing, coating, and/or calendaring to impart functional paper characteristics.

Generally, the wet-web is approximately 20% solids coming off the former, 40% solids after leaving the press section, and about 94-97% solids (3-6% moisture) as the paper on the reel. Various chemical compounds are added to the fiber slurry to impart certain functional properties to different types of paper. Fillers such as clay, talc, titanium dioxide, and calcium carbonate may be added to the slurry to impart opacity, improve brightness, improve sheet printing, substitute for more expensive fiber, improve sheet smoothness, and improve overall paper quality. Additionally, various organic compounds are added to the fiber slurry to further enhance paper characteristics. These organic compounds include, but are not limited to: starch for internal fiber bonding strength, retention aids to help hold or bind the inorganic fillers and cellulose fines in the sheet; brightening compounds; dyes; sizing agents to improve sheet printing so that the ink doesn't bleed through the sheet; as well as various other organic compounds. Sizing agents may include acid rosin, alkaline alkyl-ketene-dimer (AKD), and alkaline alkenyl-succinic-anhydride (ASA). Therefore, as the sheet is de-watered on the paper machine, many types of deposits may result on the papermaking equipment. These deposits can result from the chemicals used in the process, natural wood compounds that are not thoroughly removed from pulping processes, or from inclusion of recycled fiber in the pulp slurry as a result of water re-use.

The primary function of the press felts, other than a means of sheet conveyance, is to aid in the de-watering process of the wet-web. The press felts absorb, receive, and transport water that is expressed from the wet-web by the pressure of the roller nips. On most modern paper machines, the water is subsequently removed from the press felts by vacuum elements in the press, the vacuum elements consisting of the Uhle boxes and suction press rolls. The press felts then return in their travel loop back to the nip, and continually receive and transport water away from the web. Consequentially, the press felts become contaminated with various types of soils resulting from both the web compounds and from the process shower waters used to flush the press felts.

One type of soil found in a wide variety of papermaking processes are hydrogels. These soils are found in papermaking felts including press felts, through air drying (TAD) woven belts, forming wires and other dewatering elements found on papermaking and pulp machines. These hydrogels typically consists of polymeric materials including but not limited to wet strength resins, dry strength resins, retention aids, drainage aids, dry strength additives, Yankee coating additives and microbial derived slime. These additives include but are not limited to those derived from: starches, modified starches (cationically, anionically and hydrophobically modified), polyaminoamido epichlorohydrin (PAE) derived polymers, glyoxylated polyacrylamide resins, polyvinyl alcohols, polyacrylamide polymers, polyacrylamide/polyvinyl acetate copolymers, polyvinyl/polyvinyl acetate copolymers, and cationic derivatives of the aforementioned. In addition, hydrogels may include carboxyl methylcellulose, guar gum, and similarly derived retention aids, including but not limited to polyamines and polydiallyldimethylammonium chloride (PDADMAC).

Generally speaking, hydrogels consist of polymers which absorb water in the range of solids to water ratio of 1:2 to 1:200, and typically in the ratio of 1:10 to 1:100. Another name for hydrogels are wet soils. Another name for hydrogels is putty or wet putty. Hydrogels may also be described simply as gels.

Another type of hydrogels may be derived from the activity of microbial organisms in a press felt, which may secrete a gelatinous material commonly known as bacterial or microbial slime. Generally, these may consist of polysaccharides, glycoprotiens, or a combination of these materials.

These hydrogels will occupy a void volume disproportionate to their weight due to absorbed water, and thereby rendering the felt less able to absorb water from the wet web of paper in press section of a paper machine. As a consequence, the press felt is rendered less capable of performing its function of removing water from the paper web. This greatly reduces the performance of a paper machine in making a dry sheet of paper. Furthermore this may cause the papermachine to run more slowly, because defects in the paper, reduce paper machine output, increase the consumption of other papermaking chemicals, decrease the useful life of the papermaking felts, and generally cause papermachine instability.

Hydrogels are difficult to remove from press felts using conventional cleaners for a number of reasons. Due to their polymeric structure they are especially resistant to the action of acids, solvents, and cleaning agents. Alkaline cleaners may cause hydrogels to absorb even more water, further decreasing the ability of press felts to absorb and remove water from the paper web. The polymer bonds tend to be resistant to chemical breakdown by conventional cleaners.

Sometimes hydrogels may be removed from press felts by shutting down a paper machine and applying high levels of alkaline cleaners such as a sodium or potassium hydroxide and or oxidizing agents such a sodium hypochlorite or potassium persulfate. This strategy necessitates that the paper machine be taken out of production. This is undesirable, since the resulting loss of production incurs a large expense to the paper manufacturer.

As such, there is a decrease in the performance of the felts and interference with the efficient operation of the paper machine, often resulting in: speed reductions, sheet crushing, quality defects, excess energy consumption, holes and possibly machine downtime and increased costs.

SUMMARY

A method to control the accumulation of hydrogels while the paper machine is in production mode is highly desirable. In addition, a method to maintain the operating parameters of the press felts as close to the design specifications of the press felt for as long a period of time while the machine is in operation is also highly desirable.

There is a need in the art for methods that will improve paper machine forming wire, press felt and woven TAD belt performance, particularly the removal of hydrogels from these substrates. There is also a need in the art for methods that will improve paper machine performance, particularly the prevention of hydrogels formation in papermaking forming wires, press felts and woven TAD belts.

There is also a need in the art for methods that will improve paper machine forming wire, press felt and woven TAD belt performance, particularly the prevention of the accumulation and/or the formation of hydrogels.

Embodiments of the disclosure meet those needs by providing a method of treating papermaking forming wires, press felts and woven TAD belts that removes contaminants or prevents formation of the contaminants and improves the drainage of these felts.

According to at least one embodiment, a method for inhibiting contaminants formation during papermaking operation is provided. The method includes preparing an aqueous solution having a pH greater than 7.0 and comprising peroxide; and applying the aqueous solution onto or within one or more of forming wires, press felts and woven through air drying (TAD) belts prior to the papermaking operation to inhibit the formation of wet paper web contaminants onto the surfaces of or within the forming wires, press felts and woven TAD belts.

According to further embodiments, a method for inhibiting contaminants formation during papermaking operation is provided. The method includes preparing an aqueous solution having a pH greater than 7.0 and comprising peroxide; and applying the aqueous solution onto or within one or more of forming wires, press felts and woven through air drying (TAD) belts prior to the papermaking operation to inhibit the formation of wet paper web contaminants onto the surfaces of or within the forming wires, press felts and woven TAD belts, wherein the wet paper web contaminants comprise hydrogels having one or more of wet strength resins, dry strength resins, starch, starch derivatives, polyaminoamido epichlorohydrin adducts and reaction products, glyoxylated polyacrylamides and cationic papermaking polymers.

According to further embodiments, a method for inhibiting contaminants formation during papermaking operation is provided. The method includes preparing an aqueous solution having a pH greater than 7.0 and comprising hydrogen peroxide; and applying the aqueous solution onto or within one or more of forming wires, press felts and woven through air drying (TAD) belts prior to the papermaking operation to inhibit the formation of wet paper web contaminants onto the surfaces of or within the forming wires, press felts and woven TAD belts.

DETAILED DESCRIPTION

Figure 1A:
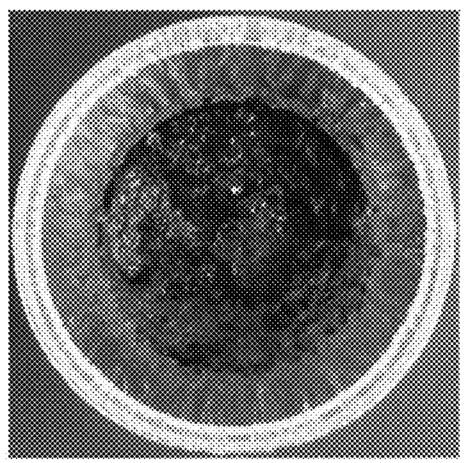
FIG. 1A is a photographic depiction of a dried wet strength sample according to one or more embodiments of the present disclosure.

Reference will now be made in detail to various embodiments of a method of treating papermaking forming wires, press felts and woven through air drying (TAD) belts that result in the prevention of the formation of hydrogels in these forming wires, press felts and woven TAD belts. These same methods of treating papermaking forming wires, press felts and woven TAD belts may be used to remove hydrogels from the same. The method includes the application of a peroxide containing solution either alone or in combination with an adjuvant to the papermaking forming wires, press felts and woven TAD belts. Embodiments of the methods can remove and/or prevent the formation of hydrogels in these felts. Thus, the methods may greatly improve the utility of press felts and other papermaking felts by preventing or eliminating detrimental deposition and deposits of hydrogels on or in the papermaking equipment.

In various embodiments, a method of treating papermaking forming wires, press felts and woven TAD belts to inhibit contaminant formation includes applying a peroxide containing aqueous solution with or without an adjuvant to the papermaking forming wires, press felts and woven TAD belts. The application of the peroxide containing aqueous solution with or without an adjuvant improves the drainage of the papermaking forming wires, press felts and woven TAD belts by inhibiting the formation of contaminants thereon. Contaminants on forming wires, press felts and woven TAD belts impede drainage as the pores and avenues for drainage are blocked. In certain embodiments, the peroxide containing aqueous solution with or without adjuvants are applied as a single aqueous solution to the papermaking forming wires, press felts and woven TAD belts. In further embodiments, multiple aqueous solutions are applied to the papermaking forming wires, press felts and woven TAD belts.

The term "papermaking felts" as used herein with reference to various embodiments is intended to include, but not necessarily be limited to, papermaking felts such as press felts, forming wires, through-air-drying (TAD) woven belts, and woven dryer belts. In some embodiments, the papermaking felts comprise forming wires, press felts, TAD woven belts and woven dryer belts. TAD woven belts are defined as papermaking felts specifically used in the Through Air Drying process for making paper.

As stated above, embodiments of the present disclosure are directed to methods for inhibiting contaminants formation onto or within press felts during papermaking operation comprises preparing an aqueous solution having a pH greater than 7.0 and comprising peroxide; and then applying the aqueous solution onto or within the press felts prior to the papermaking operation to inhibit the formation of the wet paper web contaminants onto the surfaces of or within the press felts. Specifically, the peroxide may prevent the contaminants from gelling, crosslinking, or from adhering to other materials onto the surfaces of or within the press felts.

In some embodiments, the contaminants in the papermaking felts include hydrogels as previously described. In some embodiments, the papermaking felts are contaminated with hydrogels in an amount from about 0.1 to about 100% by weight, including any value or ranges there between, as determined gravimetrically. The calculation for the wet soils is as follows: wet soils=wet weight of all papermaking contaminants/(dry weight of all papermaking contaminants+papermaking felt). A test piece of saturated press felt undergoes physical separation techniques to isolate the soils from the felt itself. These soils, when they are still wet, are weighed, dried and reweighed. For example, a wet press felt may contain 6.024 g wet soils separated from the felt. These soils then dry to a moisture free weight of 0.295 g. The separated felt is also completely dried and weighed, for example, to 9.92 g. In the example, then, the wet soils is calculated as: wet soils=6.024 g/(9.92 g+0.295 g)=0.590 or 59.0%. As described previously, wet soils include: hydrosols, hydrogels, and various combinations thereof. Hydrogels include, but are not limited to: wet and dry strength resins and Yankee dryer cylinder adhesives, including but not limited to polyamideamine-epichlorohydrin (PAE or PAEE) and glyoxalated polyacrylamide; natural and modified starches; alkylketene dimer; alkyl succinic anhydride and rosin-based sizing; carboxyl methylcellulose; guar gum; and retention aids, including but not limited to polyamines and polydadmacs. These polymers are variously described in literature known to those skilled in the papermaking industry. In addition, hydrogels will have a wet/dry ratio as calculated by (wet/dry ratio=% wet soils/% dry soils. In the example above, the % wet soils was already calculated as 59.0%. The dry soils is calculated similarly except using the weight of the dry soils instead of wet soils. In the example above: dry soils=0.295 g dry solids/9.92 g press felt=2.97%. The wet/dry ratio, then, would calculate as: wet/dry ratio=59.0%/2.97%=19.9. In one or more embodiments, the wet/dry ration may range from 8 to 100. In further embodiments, the wet/dry ration may range from 15-50.

To inhibit these hydrogels, the peroxide containing aqueous solutions are applied to the press felts. As used herein, "peroxide" may encompass various compositions such as hydrogen peroxide, peracetic acid, sodium or potassium percarbonate. Various amounts are considered suitable for the hydrogen peroxide. For example, the aqueous solutions may include 1 to 35% by weight hydrogen peroxide, or from 1 to 15% by weight hydrogen peroxide.

In various embodiments, the aqueous solution may comprise peroxide alone or in combination with other adjuvants or additives, for example, wet strength additives, and base. In further optional embodiments, the peroxide adjuvants may comprise one or more surfactants, peroxide stabilizers, peroxide activators, acids, or combinations thereof.

Various alkaline compositions are contemplated for the base. For example, the base may comprise at least one alkali metal hydroxide. In one or more embodiments, the alkali metal hydroxide may include sodium hydroxide, potassium hydroxide, or combinations thereof. In one or more embodiments, the aqueous solution may comprise from 0 wt % to 25 wt % base or from 0.5 wt % to 5 wt % base. In addition to these bases, other activators are contemplated for activating the peroxide. These may include tetraacetylethylenediamine (TAED), iron chloride, iron sulfate (either ferric or ferrous) or other activators known to those skilled in the art.

In some embodiments, the aqueous solution that is applied to the papermaking felt may further comprise a surfactant. The surfactant may be selected from nonionic surfactants, anionic surfactants, cationic surfactants and zwitterionic surfactants. In some embodiments, the surfactant may comprise dodecylbenzene sulfonate, sodium-1-octane sulfonate, sodium caprylyl sulfonate, alcohol ethoxylates, and combinations thereof. In various embodiments, the surfactant is present in the aqueous solution in an amount from about 1% to about 50% by weight based on the solids, or from about 1% to about 20% by weight based on the solids, or from about 6% to about 18% by weight based on the solids.

The aqueous solution may further comprise an organic or inorganic stabilizer. These may include but are not limited to 1-hydroxyethane 1,1-diphosphonic acid (HEDP), diethylenetriaminepenta(methylenephosphonate) (DTMPA), amino tris(methylene phosphonic acid (ATMP), sodium acid polyphosphate, and various sodium, potassium, calcium and magnesium salts thereof. The aqueous solution may comprise 1 to 30% by wt. stabilizer.

Optionally, other solvents, besides water, may be added to the aqueous solution. The aqueous solution may include one or more solvents selected from the group consisting of glycol ether solvents, paraffinic solvents, naphthenic solvents, terpene solvents, alkyl alcohols, and aryl alcohols. In one embodiment, the aqueous solution may comprise solvent in an amount from about 6% to about 18% by weight.

In some embodiments, the aqueous solution comprises 10-10,000 ppm peroxide, 1-1000 ppm stabilizer and 10-5000 ppm surfactants. In some embodiments, the aqueous solution may be derived from solutions described in U.S. Pat. No. 7,101,832, which is incorporated by reference herein in its entirety.

Various processing parameters are considered suitable for applying the aqueous solution onto the press felts prior to contacting and transporting a wet paper web comprising wet strength resins during the papermaking operation. For example, the aqueous solution may be applied at a pH from about 7.1 to 13.5, or about 7.1 to 9.5. In other embodiments, the single aqueous solution has a dynamic surface tension of about 25 to about 40. In some embodiments, the aqueous solution is applied to the papermaking felts at a temperature from about 5° C. to about 90° C. In various embodiments, the aqueous solution is applied to the papermaking felts at a temperature from about 350° C. to about 60° C. In some embodiments, the aqueous solution is applied to the papermaking felts at a dosage of about 100 ppm to about 50,000 ppm while a papermaking machine is operating. In some embodiments, the single aqueous solution is applied to the papermaking felts at a dosage of about 0.1% to about 100% while a papermaking machine is not operating.

In various embodiments, the aqueous solution is applied to the papermaking felts through high pressure needle showers, fan showers, flooded nip showers, manual foaming equipment, or manual spraying equipment. In more particular embodiments, the aqueous solution can be applied through such means to the papermaking either continuously or intermittently.

The improved drainage of the to the papermaking forming wires, press felts and woven TAD belts afforded from the inhibition and/or elimination of wet paper web contaminants on the to the papermaking forming wires, press felts and woven TAD belts allows the papermaking machines to run at relatively higher speeds. Specifically, the improved drainage necessitates less time for the dewatering of the wet web allowing the papermaking machines to run at an increased speed.

Embodiments of the present disclosure also reduce or eliminate the need to shut down a papermaking machine in order to wash the papermaking felts. The aqueous solution may be applied during papermaking operations in contrast to previous methods of hydrogel elimination which necessitated stopping production to clean the papermaking machines. Specifically, the aqueous solution may be applied in a continuous or intermittent fashion prior to contacting and transferring a wet paper web to the press felts. Additionally, the application of the aqueous solution acting to inhibit contaminant formation during papermaking operation eliminates or reduces the need to remove already deposited contamination by preventing the initial contamination.

Embodiments of the present disclosure also allow papermakers to modify the papermaking process by changing type, dosage or feedpoint, of a process chemical that tends to form troublesome hydrogels. Specifically, the dosage or formulation of the aqueous solution applied to the papermaking forming wires, press felts and woven TAD belts may be adjusted based on the specific papermaking chemicals utilized in a production run. Production of paper types or styles which generate increased formation of troublesome hydrogels may include an aqueous solution formulation target to the specific process chemicals utilized and/or the amount of aqueous solution applied to the papermaking forming wires, press felts and woven TAD belts may be increased. Further, the point of application of the aqueous solution to the papermaking forming wires, press felts and woven TAD belts may be adjusted to ensure retention of the aqueous solution immediately prior to contacting the wet paper web to the papermaking forming wires, press felts and woven TAD belts In order that various embodiments may be more readily understood, reference is made to the following examples, which are intended to illustrate various embodiments, but not limit scope thereof.

EXAMPLES

Example 1—Visual Inspection

Three solutions were prepared as shown in Table 1 to compare the contaminant formation inhibition of the method of the present disclosure to no treatment and treatment with sodium hypochlorite.

TABLE 1

| | Sample 1 | Comparative Sample 2 (Untreated) | Comparative Sample 3 (Sodium Hypochlorite) |
|---|---|---|---|
| Tap water (grams) | 11.45 | 12.65 | 12.65 |
| $H_2O_2$ (32%) (grams) | 1.4 | 0 | 0 |
| $NaClO_2$ (12.5%) (grams) | 0 | 0 | 1.4 |
| Kymene 821 (grams) | 6 | 6 | 6 |
| NaOH 1N (grams) | 1.15 | 1.35 | 1.0 |
| pH | 8.1 | 8.1 | 8.0 |

Figure 1B:
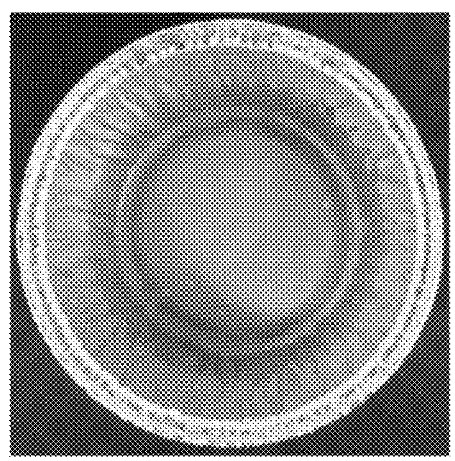
FIG. 1B is a photographic depiction of a comparative dried wet strength sample.
Figure 1C:
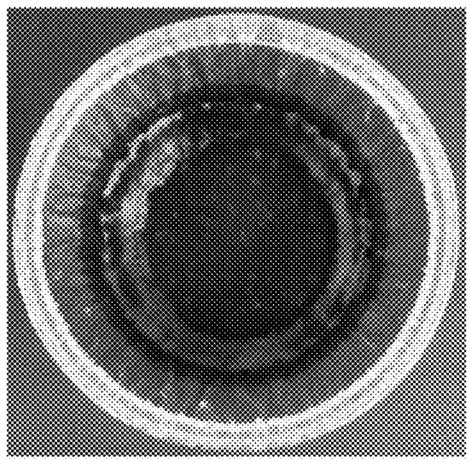
FIG. 1C is a photographic depiction of a comparative dried wet strength sample.

The solutions described in Table 1 were prepared in the order listed in Table 1. Sequential preparation was necessary so that the inhibition chemistry was present in solution before the wet strength resin (Kymene 821) had a chance to begin to cross link. Kymene 821 is a wet strength resin based on polyaminopolyamide-epichlorohydrin (PAE) chemistry commonly used in the papermaking industry. At the completion of the sample preparations, each sample solution was dried in a 230° F. (110° C.) environment overnight to render all samples completely moisture-free. Referring to the photographs of FIGS. 1A, 1B, and 1C, the tested samples dried with distinct visual appearances. With reference to FIG. 1B, the Comparative Sample 2 (untreated solution) dried into a transparent, straw-colored brittle film. With reference to FIGS. 1A and 1C, the treated solutions, Sample 1 and Comparative Sample 3 respectively however, dried darker and opaque. Comparative Sample 3 (sodium hypochlorite solution) as illustrated in FIG. 1C maintained a film-like characteristic. In contrast, Sample 1 (hydrogen peroxide solution) as illustrated in FIG. 1A dried to a more marbled, amorphous mass.

Example 2—IR Inspection

Next, the dried samples were analyzed using IR spectroscopy with particular attention to the tertiary amine (1260 $cm^{-1}$) peak, which when heated would naturally cross link. Thus, this IR inhibition test measures the degree to which the functionality of wet strength resin to cross link and form hydrogels is inhibited.

Figure 2:
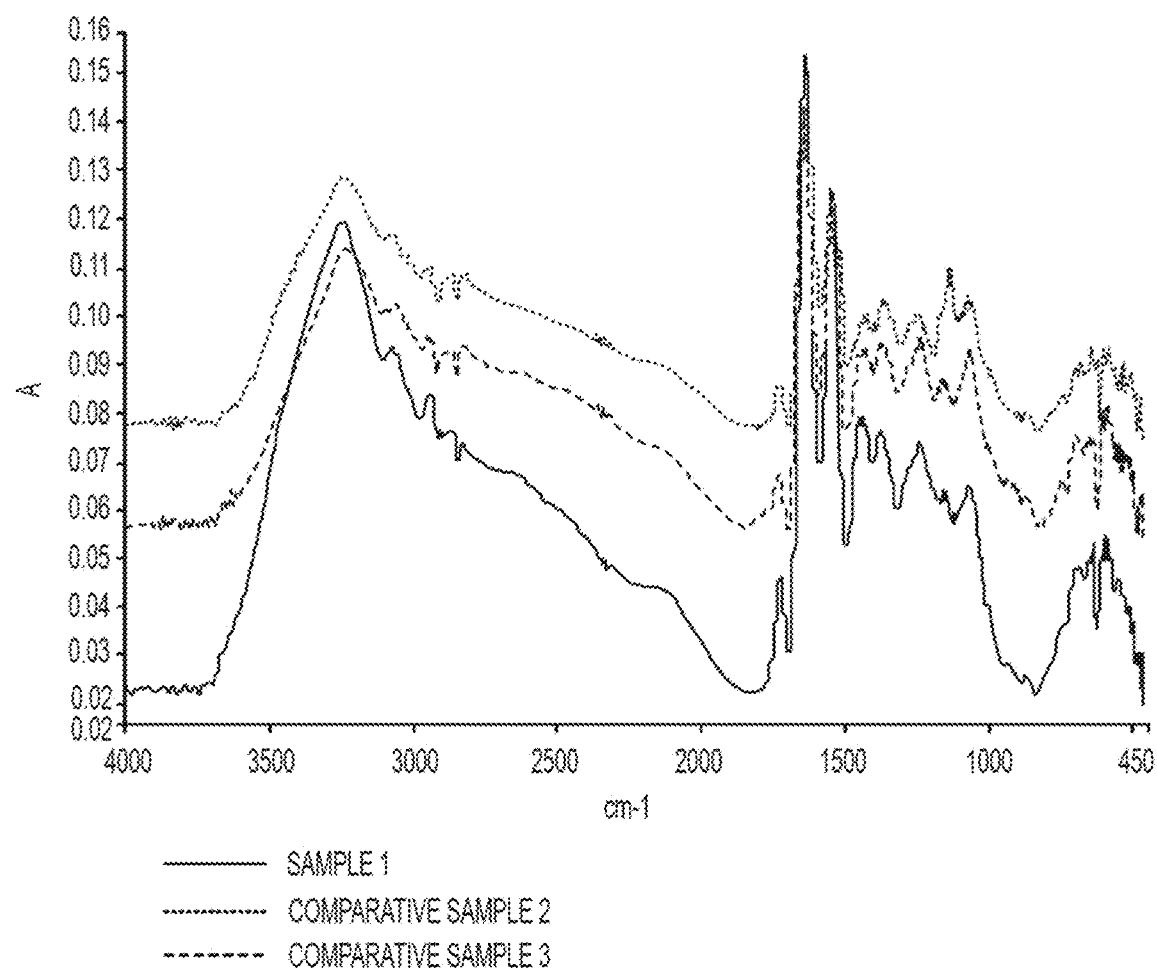
FIG. 2 shows the IR spectra of dried wet strength samples according to one or more embodiments of the present disclosure.

The resulting spectra are depicted in FIG. 2. The spectra have similar, but not identical, peaks and peak intensities. The differences and distinctions in the peaks and peak intensities provide guidance as to the cross linking behavior of the tertiary amines and the formation of hydrogels.

The results of the IR spectroscopy were quantified using the ratio of the tertiary amine peak to a reference amide peak. The tertiary amine peak is a reactive peak for cross linkage. When that peak is present in the dried solution, it is evidence that the (WSR) has crosslinked. However, the hydrogen peroxide pretreatment chemistry of Sample 1 was found to break down the tertiary amine, such that minimal to no cross linking occurred. The absorbance measurements of the tertiary amine peaks (1260 $cm^{-1}$) were recorded, as were the absorbance measurements of a general amide peak (1635 $cm^{-1}$). This amide peak was consistent for each the three tested solutions, and thus provides a consistent reference across tests as a reference peak. The ratio of the tertiary amine peak absorbance to the reference peak absorbance was calculated to yield a relative tertiary amine peak for all solutions. Referring to Table 2 presented below, the larger the ratio, the larger the tertiary amine content relative to the reference peak, and thus the more cross linked the polymer. As is evident in Table 2, the sodium hypochlorite ratio (0.6299) of Comparative Example 3 is more similar to the untreated ratio (0.6975) of Comparative Example 2 than that of the peroxide treated ratio (0.4519) of Example 1. Thus, the peroxide solution is significantly better at reducing the cross linking ability of the wet strength resin (Kymene 821) compared to the hypochlorite. Based on these results it may be determined that Sample 1 does not have significant cross linking of the wet strength resin representing wet paper web contaminants. Conversely, it may be determined that Comparative Example 2 and Comparative Example 3 demonstrate significant cross linking of the wet strength resin.

TABLE 2

| Sample | Peak at 1260 (tertiary amine) | Peak at 1635 (amide) | Ratio - Tertiary:Amide | Conclusion |
|---|---|---|---|---|
| Sample 1 (Peroxide) | 0.0691 | 0.1529 | 0.4519 | Not Cross Linked |
| Comparative Sample 2 (untreated) | 0.0987 | 0.1415 | 0.6975 | Cross Linked |
| Comparative Sample 3 (sodium hypochlorite) | 0.0902 | 0.1432 | 0.6299 | Cross Linked |

Example 3—Viscosity Visual Inspection

Further test samples were prepare to correspond to Sample 1, Comparative Example 2, and Comparative Example 3. Specifically, Sample 2 was prepared with $H_2O_2$ as was Sample 1, Comparative Example 4 was prepared without a treatment agent as was Comparative Example 2, and Comparative Example 5 was prepare with NaClO as was Comparative Example 3.

Sample 2, Comparative Example 4, and Comparative Example 5 were prepared by combining ingredients in the order listed in Table 3. The formulations were prepared by adding 1.6 ml of NaOH (50%) to 80 grams (g) of Kymene 821 using an automatic pipette and then 5 g of the selected treatment agent was added to the solution of NaOH and Kymene 821. For Sample 2, the treatment agent was $H_2O_2$. For Comparative Sample 4, no treatment agent was added. For Comparative Sample 5, the treatment agent was NaClO. Each solution was shaken by hand between each ingredient addition to ensure complete mixing. After initial formulation of each solution the pH was measured. If the pH was not 11±2% the formulation was adjusted accordingly to move it into the desired range. As such, additional NaOH was added to Sample 2 and Comparative Sample 5 to achieve a pH of 11.09 in accordance with Table 3. Each prepared solution was placed into a 4 oz. glass jar and capped. The glass jars were placed in a 120° F. (48.9° C.) oven overnight and then removed and allowed to cool to room temperature. The viscosity of each solution was measured using a Brookfield viscometer (spindle 2/30 rpm) if not already in a gel form.

TABLE 3

| Test Samples | Formulation | Treatment Agent | Actives (%) | pH | viscosity (cPs) |
|---|---|---|---|---|---|
| Sample 2 | 80 g Kymene 821 + | $H_2O$ | 1.6 | 11.09 | 25 |
| Comparative Sample 4 | 1.6 mL of NaOH (50%) + 5 g | untreated | 0 | 11.01 | gel |
| Comparative Sample 5 | Treatment Agent | NaClO | 0.625 (as $Cl_2$) | 11.09 | gel |

Figure 3A:
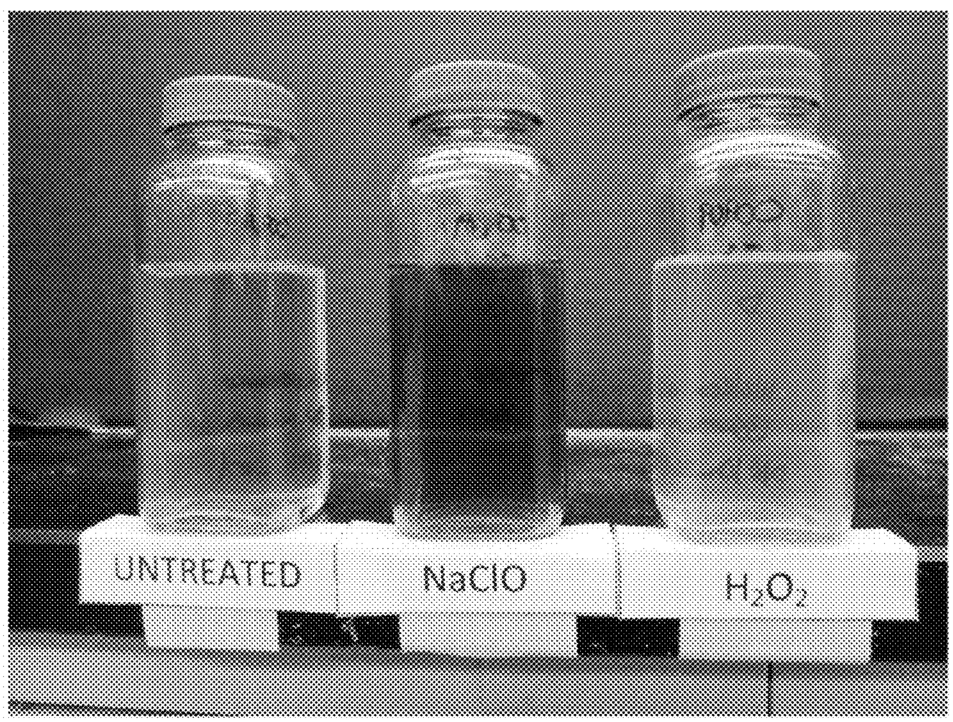
FIG. 3A is a photographic depiction of aqueous solution samples whether untreated or treated with bleach or peroxide according to one or more embodiments of the present disclosure.
Figure 3B:
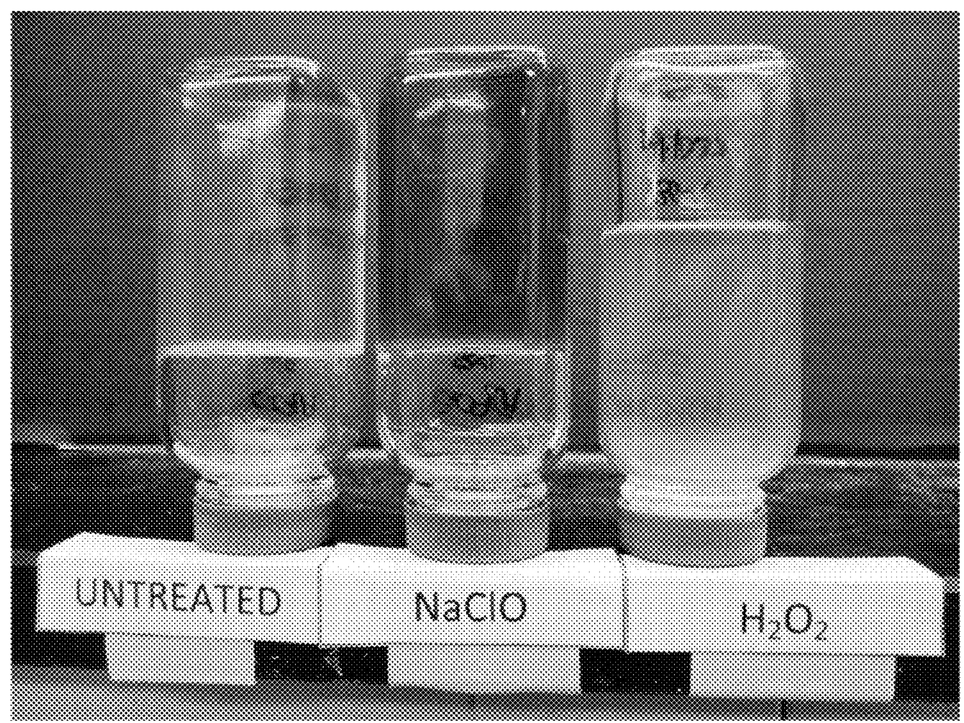
FIG. 3B is a photographic depiction of the sample of FIG. 3A inverted.

Before viscosity measurement multiple photos were taken of each of the jars holding Sample 2, Comparative Sample 4, and Comparative Sample 5. Referring to FIGS. 3A and 3B, which include upright and inverted photos respectively of each solution, the viscosity control yielded by the hydrogen peroxide in Sample 2 is demonstrated. In the inverted photo of FIG. 3B, the untreated and NaClO treated PAE gels of Comparative Sample 4 and Comparative Sample 5 respectively are so thick that they cling to the bottle. That is the gelled solution may be visualized as remaining in place in the jar and not reacting to the force of gravity in a downward direction. In contrast, the peroxide treated PAE of Sample 2 remains in liquid form that easily flows when the bottle is inverted.

It should now be understood that the various aspects of the method for inhibiting contaminants formation during papermaking operation are described and such aspects may be utilized in conjunction with various other aspects.

In a first aspect, the disclosure provides method for inhibiting contaminants formation during papermaking operation. The method comprises preparing an aqueous solution having a pH greater than 7.0 and comprising peroxide; and applying the aqueous solution onto or within one or more of forming wires, press felts and woven through air drying (TAD) belts prior to contacting and transporting a wet paper web to inhibit the formation of wet paper web contaminants onto the surfaces of or within the forming wires, press felts and woven TAD belts.

In a second aspect, the disclosure provides the method of the first aspect, in which the wet paper web contaminants comprise hydrogels having one or more of wet strength resins, dry strength resins, starch, starch derivatives, polyaminoamido epichlorohydrin adducts and reaction products, glyoxylated polyacrylamides and cationic papermaking polymers.

In a third aspect, the disclosure provides the method of the first or second aspects, in which the aqueous solution comprises peroxide, wet strength additive, and base.

In a fourth aspect, the disclosure provides the method of the third aspect, in which the base comprises at least one alkali metal hydroxide.

In a fifth aspect, the disclosure provides the method of any of the first through fourth aspects, in which the peroxide is hydrogen peroxide.

In a sixth aspect, the disclosure provides the method of the fifth aspect, in which the aqueous solution comprises the hydrogen peroxide in an amount from about 1% to about 15% by weight.

In a seventh aspect, the disclosure provides the method of any of the first through sixth aspects, in which the pH of the aqueous solution ranges from about 7.1 to about 13.5.

In an eighth aspect, the disclosure provides the method of any of the first through seventh aspects, in which the aqueous solution further comprises adjuvants selected from surfactants, peroxide stabilizers, peroxide activators, acids, or combinations thereof.

In a ninth aspect, the disclosure provides the method the eighth aspect, in which the surfactant is selected from a group consisting of nonionic surfactants, anionic surfactants, cationic surfactants and zwitterionic surfactants.

In a tenth aspect, the disclosure provides the method of any of the first through ninth aspects, in which the aqueous solution comprises one or more solvents selected from the group consisting of glycol ether solvents, paraffinic solvents, naphthenic solvents, terpene solvents, alkyl alcohols, and aryl alcohols.

In an eleventh aspect, the disclosure provides the method of the tenth, in which the aqueous solution comprises solvent in an amount from about 6% to about 18% by weight.

In a twelfth aspect, the disclosure provides the method of any of the first through third aspects, in which the aqueous solution is applied to the press felts at a temperature from about 5° C. to about 350° C.

In a thirteenth aspect, the disclosure provides the method of any of the first through twelfth aspects, in which the aqueous solution has a dynamic surface tension of about 25 to about 40 dynes/cm.

In a fourteenth aspect, the disclosure provides the method of any of the first through thirteenth aspects, in which the aqueous solution is applied in an amount of about 100 ppm to about 50,000 ppm.

Having described the invention in detail and by reference to preferred embodiments thereof, it will be apparent that modifications and variations are possible without departing from the scope of the claimed subject matter. Thus, it is intended that the specification cover the modifications and variations of the various embodiments described herein provided such modifications and variations come within the scope of the appended claims and their equivalents.

Unless otherwise indicated, the disclosure of any ranges in the specification and claims are to be understood as including the ranges itself and also anything subsumed therein, as well as endpoints.

What is claimed is:

1. A method for inhibiting contaminants formation during papermaking operation, the method comprising:

preparing an aqueous solution having a pH greater than 7.0 and comprising peroxide; and applying the aqueous solution onto or within one or more of forming wires, press felts and woven through air drying (TAD) belts prior to contacting and transporting a wet paper web to inhibit the formation of wet paper web contaminants onto the surfaces of or within the forming wires, press felts and woven TAD belts, wherein the wet paper web contaminants comprise hydrogels having one or more of wet strength resins, dry strength resins, starch, starch derivatives, polyamino-amido epichlorohydrin adducts and reaction products, glyoxylated polyacrylamides and cationic papermaking polymers.

2. The method of claim 1 wherein the aqueous solution comprises peroxide, wet strength additive, and base.

3. The method of claim 2 wherein the base comprises at least one alkali metal hydroxide.

4. The method of claim 1 wherein the peroxide is hydrogen peroxide.

5. The method of claim 4 wherein the aqueous solution comprises the hydrogen peroxide in an amount from about 1% to about 15% by weight.

6. The method of claim 1 wherein the pH of the aqueous solution ranges from about 7.1 to about 13.5.

7. The method of claim 1 wherein the aqueous solution further comprises adjuvants selected from surfactants, peroxide stabilizers, peroxide activators, acids, or combinations thereof.

8. The method of claim 7 wherein the surfactant is selected from a group consisting of nonionic surfactants, anionic surfactants, cationic surfactants and zwitterionic surfactants.

9. The method of claim 1 wherein the aqueous solution comprises one or more solvents selected from the group consisting of glycol ether solvents, paraffinic solvents, naphthenic solvents, terpene solvents, alkyl alcohols, and aryl alcohols.

10. The method of claim 9 wherein the aqueous solution comprises solvent in an amount from about 6% to about 18% by weight.

11. The method of claim 1 wherein the aqueous solution is applied to the press felts at a temperature from about 5° C. to about 350° C.

12. The method of claim 1 wherein the aqueous solution has a dynamic surface tension of about 25 to about 40 dynes/cm.

13. The method of claim 1 wherein the aqueous solution is applied in an amount of about 100 ppm to about 50,000 ppm.

* * * * *